(12) United States Patent
Pilat, Jr.

(10) Patent No.: US 6,595,634 B1
(45) Date of Patent: Jul. 22, 2003

(54) EYEGLASS FRAME ASSEMBLY

(76) Inventor: James F. Pilat, Jr., 309 W. 57th St., Apt. 1001, New York, NY (US) 10019

( * ) Notice: Subject to any disclaimer, the term of this patent is extended or adjusted under 35 U.S.C. 154(b) by 0 days.

(21) Appl. No.: 10/269,811

(22) Filed: Oct. 11, 2002

Related U.S. Application Data

(60) Provisional application No. 60/394,837, filed on Jul. 10, 2002.

(51) Int. Cl.[7] .................................................. G02C 1/00
(52) U.S. Cl. ............................ 351/41; 351/92; 351/103
(58) Field of Search .............................. 351/41, 83, 86, 351/90, 92, 103, 104, 105, 106, 107, 108, 109

(56) References Cited

U.S. PATENT DOCUMENTS 5,684,558 A * 11/1997 Hamamoto ................. 351/106

* cited by examiner

*Primary Examiner*—Hung Xuan Dang

(57) ABSTRACT

A specially designed eyewear frame is provided. The frame utilizes multi-filament cable in order to define the lens openings of the frame. Such cable is both flexible and strong so that it can easily wrap around the lens elements when assembling the glasses.

13 Claims, 7 Drawing Sheets

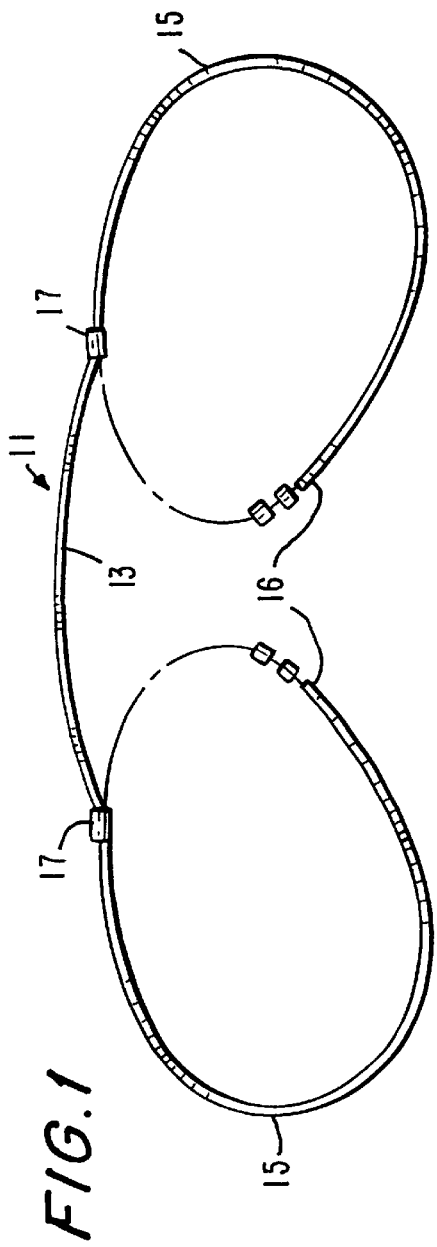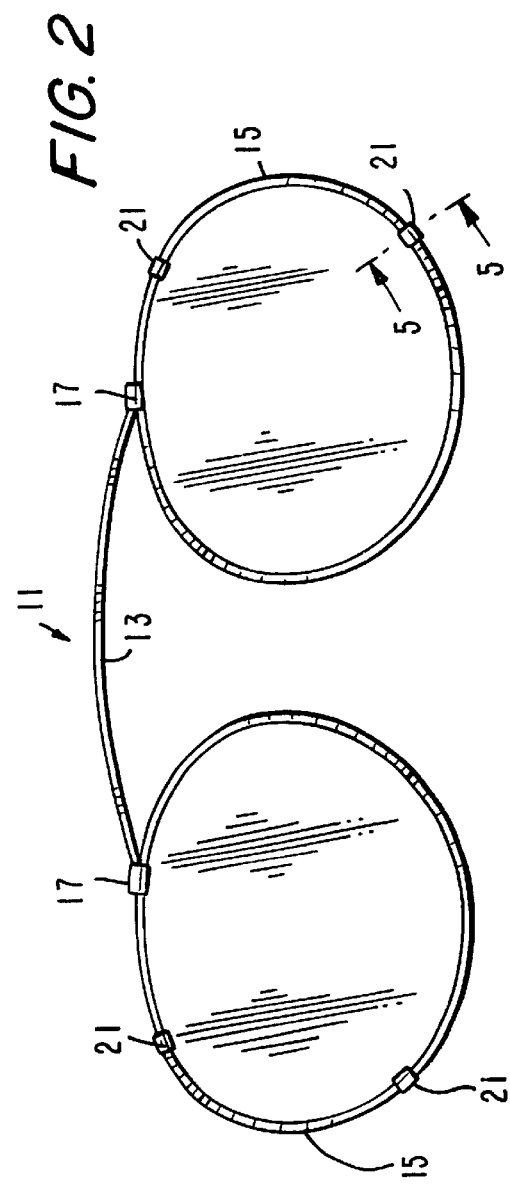

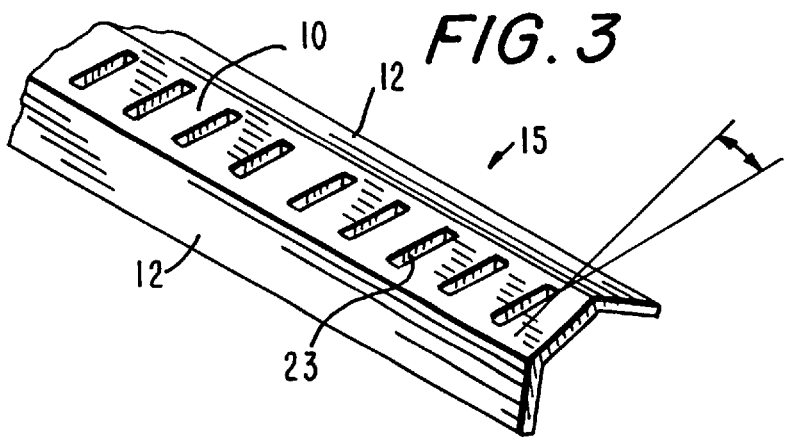
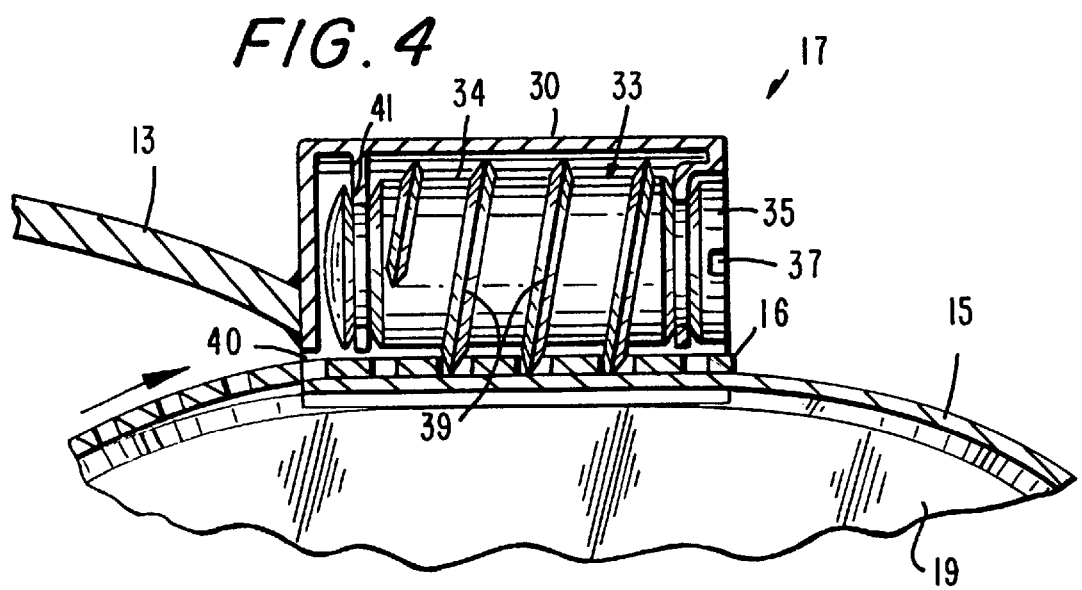
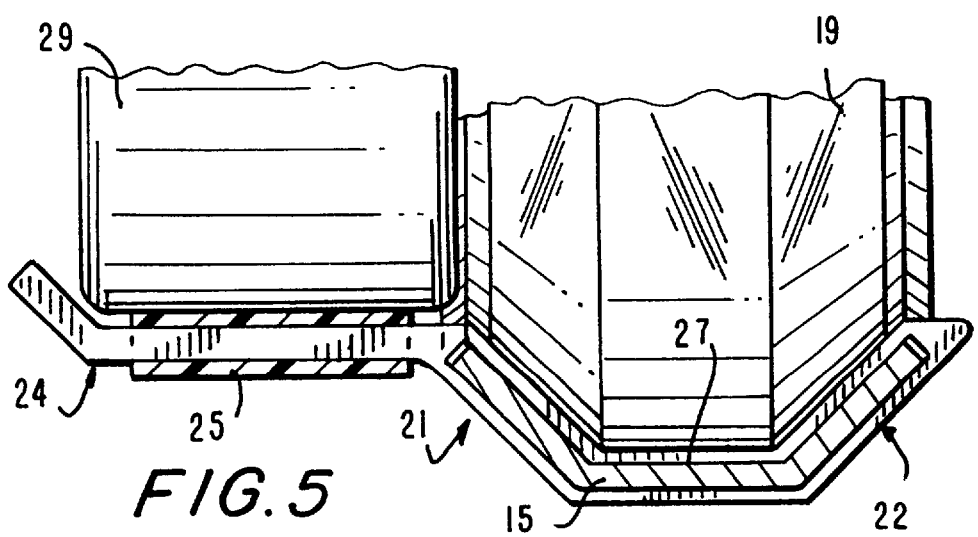

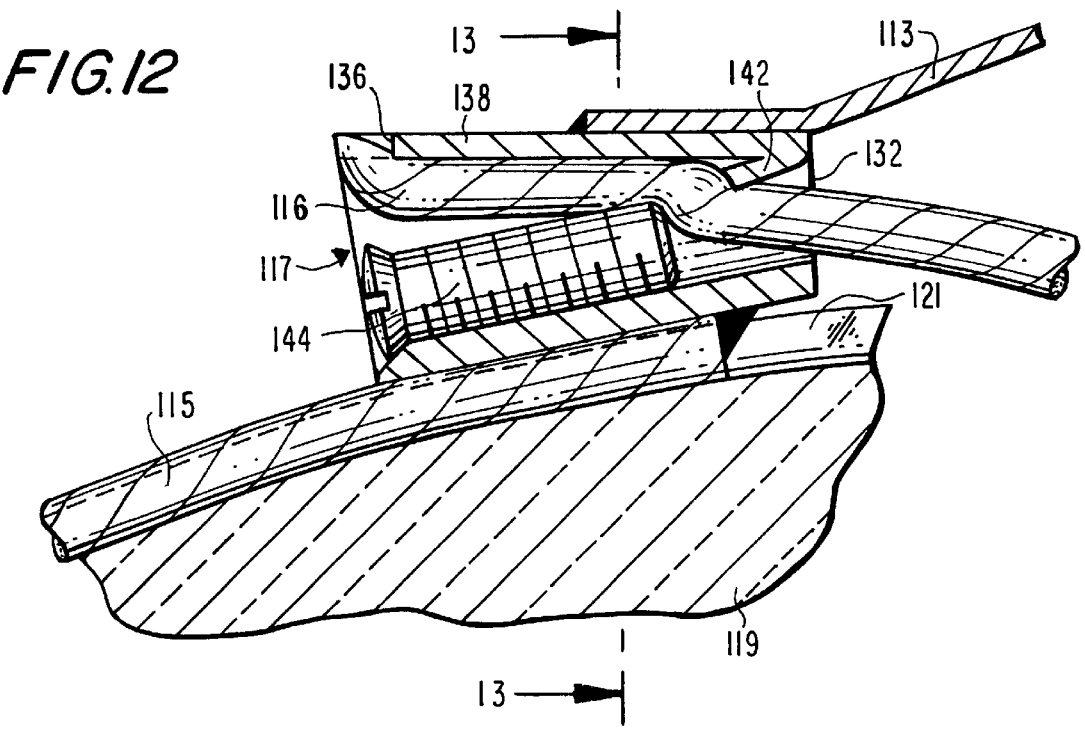
FIG. 12
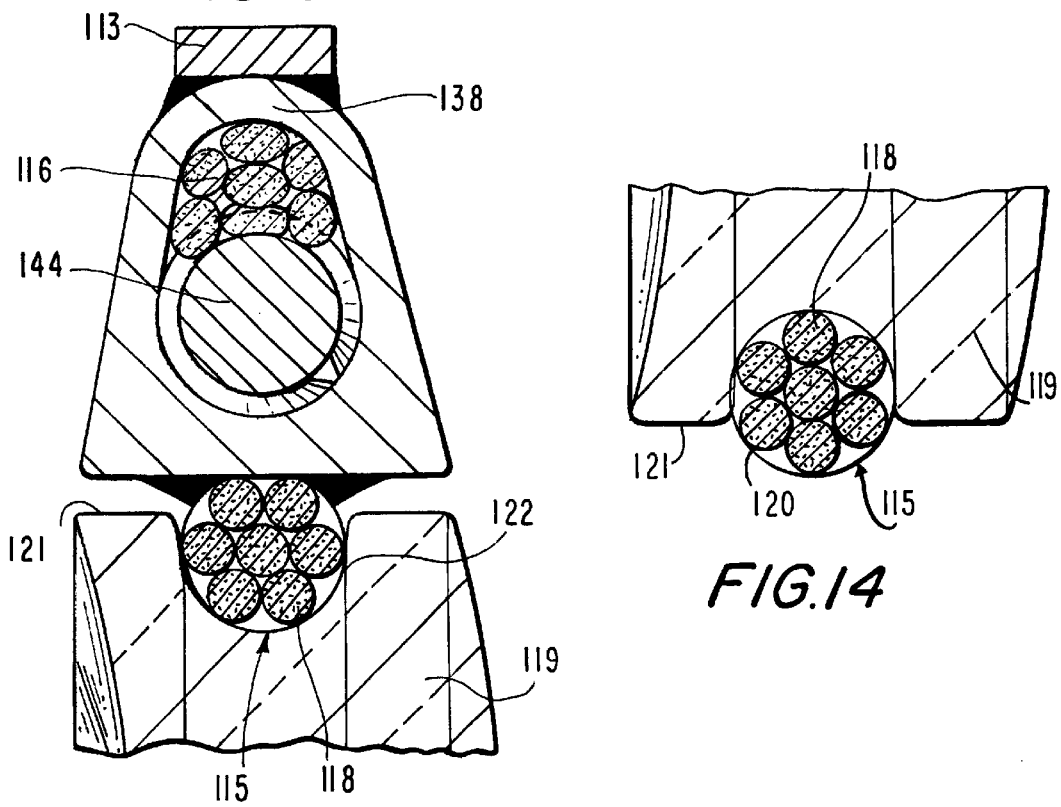
FIG. 13
FIG. 14

EYEGLASS FRAME ASSEMBLY

RELATED APPLICATIONS

This application claims priority to a provisional application Serial No. 60/394,837 filed on Jul. 10, 2002, and incorporated herein by reference.

BACKGROUND OF THE INVENTION

This invention relates to an optometric device, and more particularly, to a customized sunglasses clip unit specially sized to coordinate with a person's regular eyeglasses. The invention also relates to a specially designed eye-glass frame.

As is well known, millions of individuals wear sunglasses in order to improve their vision and comfort on bright sunny days. Sunglasses, of course, reduce glare and shade the eyes of the wearer. Sunglasses on the market have various designs and styles, which oftentimes can create a certain "look."

For those individuals who do not require corrective eyeglass lenses, a variety of low cost sunglasses may be purchased from various stores and retail chains. However, for those many individuals who are nearsighted, farsighted, or otherwise have poor vision, and therefore wear corrective eyeglasses on a routine basis, a separate pair of prescription sunglasses is required, which can be very expensive. This is especially so for those individuals whose prescriptions change on a frequent basis; those individuals not only must purchase a regular pair of eyeglasses each time, but must also purchase a separate pair of sunglasses each time.

Clip-on sunglasses are a low cost option to prescription sunglasses. In general, clip-on sunglasses are attached or otherwise "clipped" onto conventional prescription eyewear in order to convert the eyewear into sunglasses. Nonetheless, although clip-on sunglasses are much more cost effective than purchasing prescription sunglasses, clip-on sunglasses are less than desirable, in part because they are normally manufactured in a limited number of designs, sizes and shapes which may or may not conform to the lens design of the eyeglasses worn by the individual.

Accordingly, it would be desirable to provide clip-on sunglasses which are customized in design in order to coordinate with a person's regular eyeglasses.

SUMMARY OF THE INVENTION

Generally speaking, in accordance with the invention, a customized sunglass clip assembly is provided. The assembly includes a clip element comprising a central tension bar having first and second opposite ends, as well as a pair of flexible wires each having a first end attached to one of the ends of the tension bar and a second free end selectively feedable through and lockable by a corresponding screw locking unit fixed to the tension bar. Each wire is designed for wrapping around a sunglass lens that is cut out to a desired shape and size. Preferably, the wire is a multi-filament cable wire.

In use, the optician first prepares or cuts a pair of sunglass lenses that are identical in size and shape to the lenses of the wearer's regular prescription eyeglasses. Each wire of the clip unit is wrapped around one of the cutout lenses. Then, the free end of the wire is fed through a corresponding locking assembly where it is grabbed or pinched by a screw. In assembly, excess wire is cut off after engagement with the lock assembly.

Also in accordance with the invention, a specially designed eyewear frame is provided. The frame utilizes multi-filament cable in order to define the lens openings of the frame. Such cable is both flexible and strong so that it can easily wrap around the lens elements when assembling the glasses.

Accordingly, it is an object of the invention to provide an improved customized sunglass clip assembly.

It is also an object of the invention to provide an improved eyewear frame assembly.

Another object of the invention is to provide an improved sunglass clip assembly which conforms to the size, shape and design of the wearer's prescription eyeglasses.

Yet a further object of the invention is to provide a sunglass clip assembly which is inexpensive to manufacture and purchase, as well as user friendly.

Another object of the invention is to provide an improved eyeglass frame design that utilizes multi-filament wire.

Still another object of the invention is to provide an improved sunglass clip assembly which is fabricated using conventional tooling.

A further object of the invention is to simply provide an improved sunglass clip assembly which can be produced by an optician in a relatively short period of time.

Still other objects and advantages of the invention will in part be obvious, and in part be apparent from the following description.

The invention accordingly comprises the system and assembly possessing the features, properties and relation of elements which are exemplified in the following detailed disclosure, and the scope of the invention will be indicated in the claims.

BRIEF DESCRIPTION OF THE DRAWINGS

For a fuller understanding of the invention, reference is made to the following description, taken in connection with the accompanying drawings, in which:

FIG. 1 is a front elevational view of an unfinished clip unit of the inventive sunglass clip assembly;

FIG. 2 is a front elevational view of the finished sunglass clip assembly of the invention;

FIG. 3 is an enlarged perspective view of a portion of the wire that is used in the inventive sunglass clip assembly;

FIG. 4 is a cross-sectional view of the screw locking unit of the inventive sunglass clip assembly;

FIG. 5 is a cross-sectional view showing the bottom hook unit of the inventive sunglass clip assembly;

FIG. 12 is a cross-sectional view taken along line 12—12 of FIG. 11;

FIG. 13 is a cross-sectional view taken along line 13—13 of FIG. 12;

FIG. 14 is a cross-sectional view taken along line 14—14 of FIG. 11;

DETAILED DESCRIPTION OF THE PREFERRED EMBODIMENTS

Figure 6:
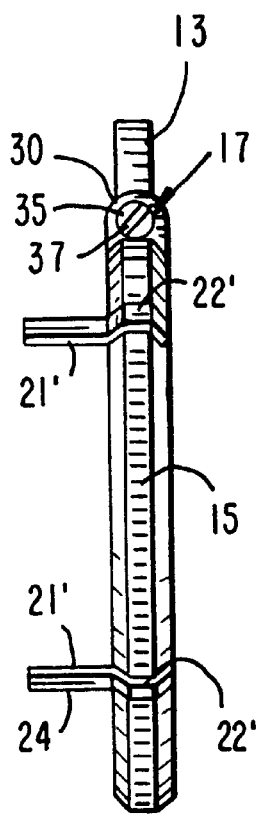
FIG. 6 is a side elevational view of the sunglass clip assembly.

Referring first to FIG. 1, a clip element or unit generally indicated at 11 and used in making the customized sunglass clip assembly of the invention is shown. Clip element 11 includes a tension bar 13 made from a metal, metal alloy or metal composite composition and a pair of flexible and bendable wires 15 arcuately extending from either end of tension bar 13. Each of wires 15 is made from a metal, metal alloy or metal composite and is constructed to be extremely pliable so that it can easily wrap around a sunglass lens, as described below. Each wire has a free end 16 which, during assembly, is fed through a corresponding screw locking unit 17 located at either end of tension bar 13, as further described later on.

Referring now to FIG. 3, as well as to FIG. 4, each wire 15 is now better described. Wire 15 comprises a longitudinally extending main wall 10 and a pair of longitudinally extending sidewalls 12, which together are sized for wrapping about and otherwise grabbing the edge wall of a sunglass lens 19 (see FIG. 4) during production of the inventive sunglass clip assembly. Front wall 10 is formed with a plurality of running grooves 23 which are grabbed by the screw of locking unit 17 during final assembly of the inventive system (see FIG. 4 once again), as described later on.

Referring now in particular to FIG. 4, as well as FIG. 6, each of screw locking units 17 is now described in greater detail. Each of screw locking units 17 is fixed at one of the ends of tension bar 13 (see FIG. 1) and is defined by a tubular-shaped housing 30. Housing 30 is made of stainless steel, carbide, titanium, or some other high performance metal and contains a metal screw member generally indicated at 33 having a body 34 formed with a plurality of outer annular threads 39, and a head 35 at one end formed with single slot 37. Slot 37 is sized for receiving the end of a conventional screwdriver in order to selectively turn screw member 33 so as to lock wire 15 therewith, as described hereinafter.

Housing 30 of locking unit 17 is formed with a passage 40 running therethrough that is sized for selectively receiving free end 16 of wire 15 as screw member 33 is turned. Housing 30 also includes an integrally formed stop 41 which prevents translational movement of screw unit 33 from sliding or otherwise moving in either lateral direction.

FIG. 5 describes in more detail a first embodiment of each of hook assemblies 21 which are used to maintain overlying engagement of the inventive sunglass clip assembly when placed or worn over a pair of conventional eyeglasses during use. Hook assembly 21 includes a first sunglass hook element generally indicated at 22 and a second eyeglass hook element generally indicated at 24. Hook element 22 includes a slot 27 through which wire 15 runs (also see FIG. 2) and is sized for fitting underneath sunglass lens 19.

Eyeglass hook element 24 of hook assembly 21 is formed with a cushion 25 disposed therearound on which an eyeglass frame 29 can sit, as shown in FIG. 5. As can be appreciated from viewing FIG. 5, hook assembly 21 enables the inventive sunglass clip assembly to be aligned with the eyeglass frame of the prescription eyeglasses during use.

In assembly, an optician first prepares a pair of sunglass lenses 19 identical in size, shape and design to the lenses of a wearer's regular eye-glasses. Then, utilizing clip unit 11 depicted in FIG. 1, each wire 15 first fed through slot 27 of hook assembly 21, and then wrapped around lens 19. Then, free ends 16 of each wire 15 are fed into passage 40 of corresponding locking unit 17 (see FIG. 4). By turning screw member 33, as described before, threads 39 engage or grab end 16 of wire 15 along running grooves 23 in order to lock end 16 into locking unit 17. As a result, a custom sunglass clip assembly as depicted in FIG. 2 is produced.

Figure 7:
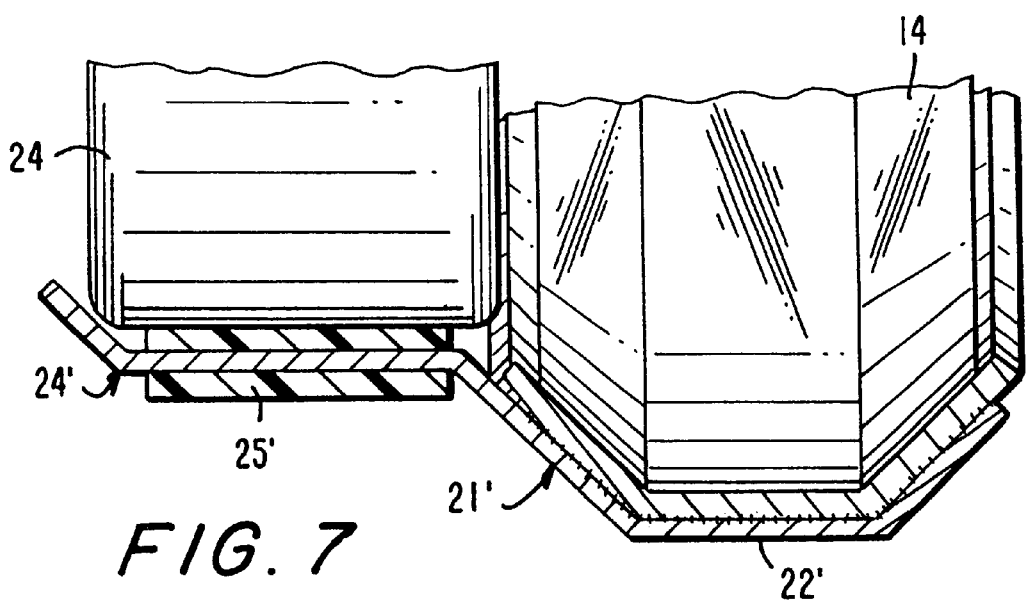
FIG. 7 is a cross-sectional view of an alternative version of the hook unit as depicted in FIG. 6.

FIGS. 6 and 7 describe in more detail an alternative version of the hook assembly, generally indicated at 21'. Hook assembly 21' comprises a first sunglass hook element 22' and a second eyeglass hook element 24'. Hook element 22' is formed integrally and continuous with wire 15, as shown in FIG. 6. Hook element 24' is identical to hook element 24 depicted in FIG. 5 and has a cushion 25' disposed thereabout. In this embodiment, a pair of hook assemblies 21' are used. Assembly of the invention is as described above.

As can be appreciated with respect to the embodiment of FIGS. 1–7, most often during assembly, there will be excess wire. Typically, the excess wire is first cut to a length that is sufficient for wrapping around the sunglass lens and locking at its end within its respective locking unit.

Figure 8:
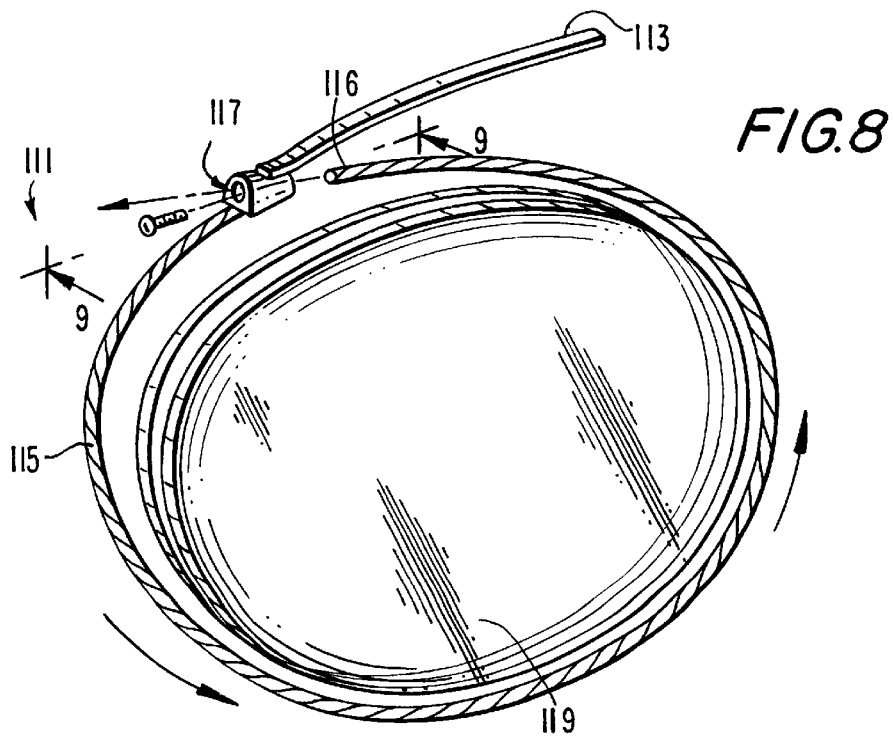
FIG. 8 is a perspective view of a second embodiment of a portion of an unfinished clip unit of the inventive sunglass clip assembly.
Figure 9:
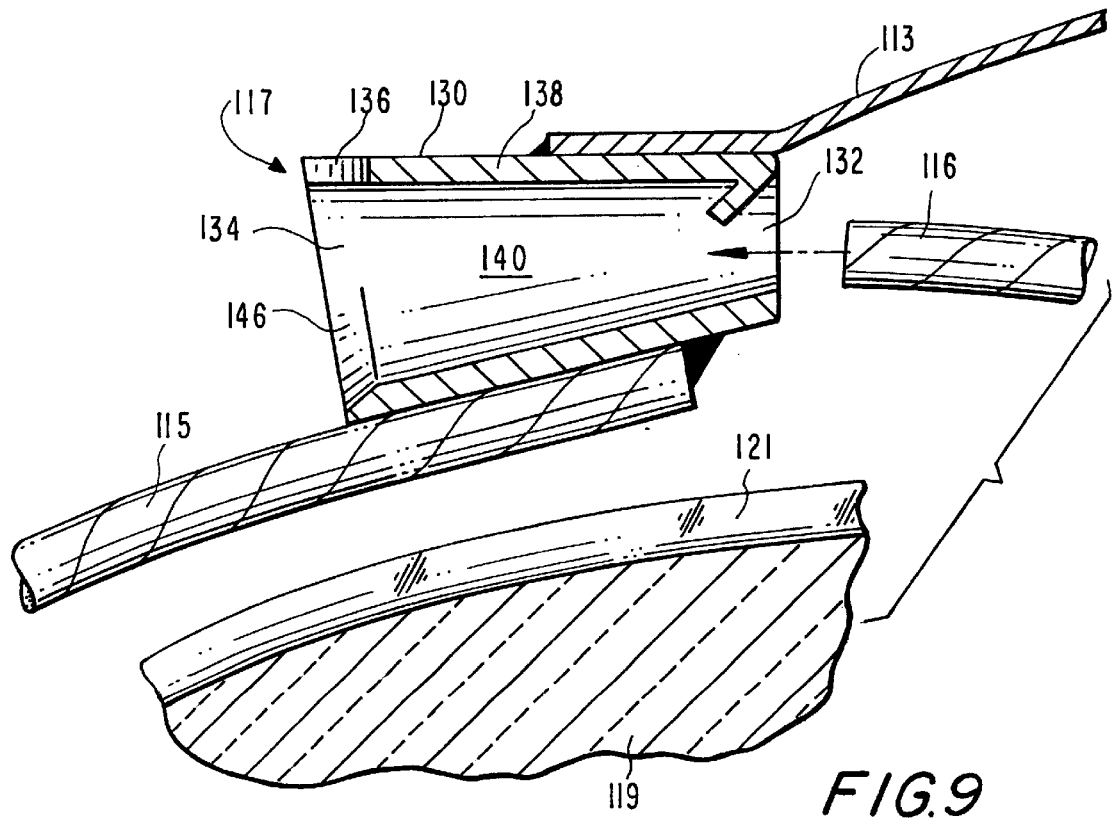
FIG. 9 is a cross-sectional view taken along line 9—9 of FIG. 8.

Referring now to FIGS. 8 and 9, a second embodiment of a clip element or unit generally indicated at 111 and used to make the customized sunglass clip assembly of the invention as shown. Clip element 111 includes a tension bar 113 made from a metal, metal alloy or metal composite composition and a pair of flexible and bendable wires 115 arcuately extending from either end of tension bar 113. Each wire 115 is made from a multi-filament material such as a multi-filament cable wire, preferably made from a metal or metal alloy, but also from a nylon, polymer, resin, natural fiber or other naturally occurring or man-made material, as is well known. The preferred multi-filament material is a multi-filament cable wire comprising a plurality of filaments 118 (see FIG. 14), and retained in a casing 120, which, by way of example only, can be selected from fishing leader wire. Such cable wire is extremely flexible and strong so that it can easily wrap around a sunglass lens in a secure fashion, as described below. Preferably, the multi-filament cable wire has a thickness of between 0.4 and 1.6 mm, and more preferably of between 0.4 and 0.6 mm. The multi-filament cable wire used in the inventive system has superior flexibility and strength as compared to conventional wires, making assembly easier, as described hereinafter.

Each wire 115 has free end 116 which, during assembly, is fed through a corresponding locking unit 117 located at and attached to the ends of tension bar 113 (see FIG. 9). Wire 115 is sized for wrapping about and otherwise grabbing outer edge 121 of sunglass lens 119 (see FIG. 10) during production of the inventive sunglass clip assembly. Significantly, outer edge 121 of sunglass lens 19 is formed with a groove 122 (see FIGS. 13 and 14) along which wire 115 is abutingly received.

Figure 10:
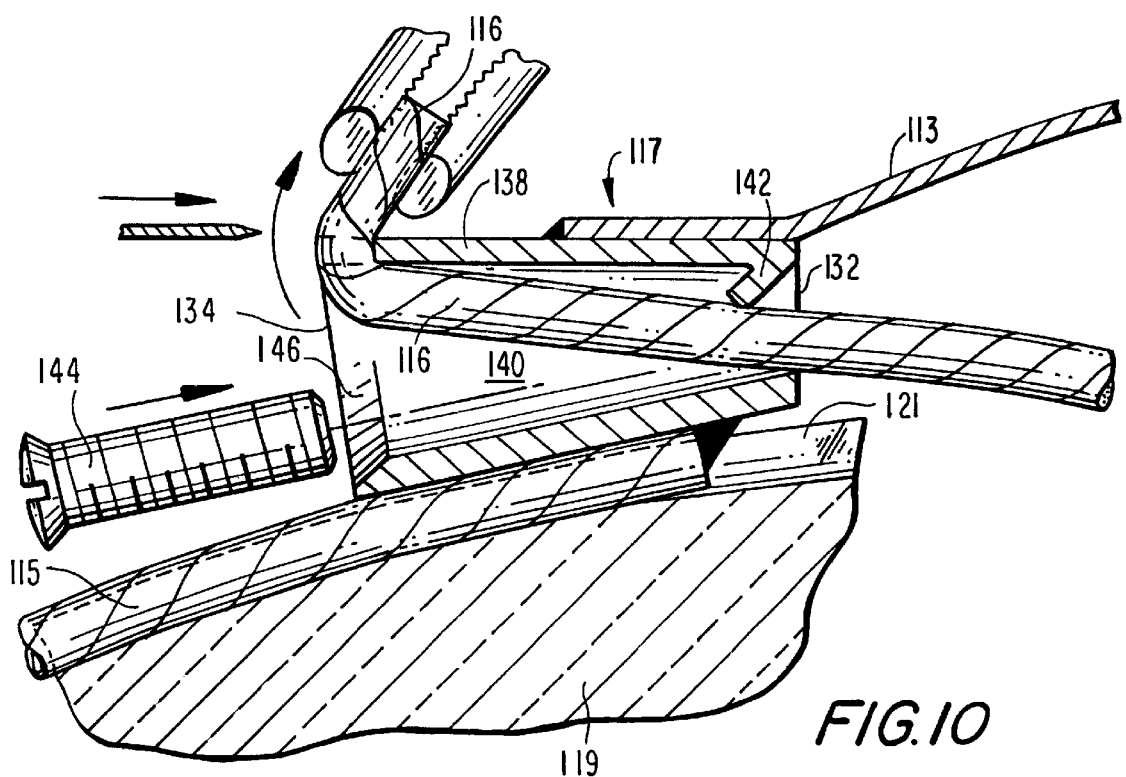
FIG. 10 is a cross-sectional view similar to FIG. 9 and showing assembly of the second embodiment of the inventive sunglass clip assembly.
Figure 11:
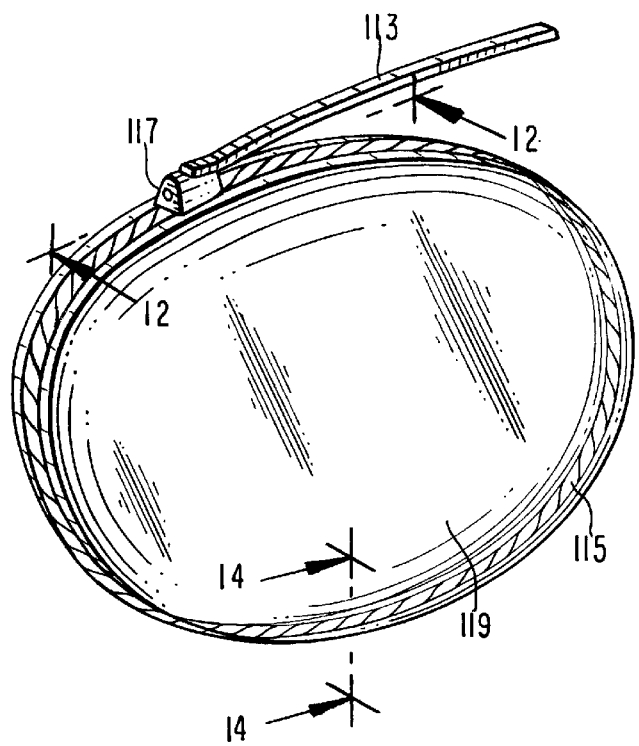
FIG. 11 is a perspective view of a portion of the second embodiment of is the finished sunglass clip assembly of the invention.

As shown in FIGS. 9 and 10, locking unit 117 is fixed at one of the ends of tension bar 113 and is defined by a housing 130. Housing 130 includes a roof 138 and is made of stainless steel, carbide, titanium or some other high performance metal. Housing 130 is formed with an opening 132 leading into a passage 140 running therethrough that is sized for selectively receiving free end 116 of wire 115. Passage 140 then leads to an opening 134 including an upper slot 136 located at the rear end of roof 138. Importantly, a pivotally flexible membrane 142 depends from roof 138 adjacent opening 132 of housing 130 and is otherwise disposed inside passage 140.

In assembly, an optician first prepares a pair of sunglass lenses 119 similar in size, shape and design to the lenses and/or frame of a wearer's regular eyeglasses. Then, utilizing clip unit 111 depicted in FIGS. 8–14, wire 115 is wrapped around lens 119 and its free end 116 is fed through opening 132 and into passage 140 of corresponding locking unit 117. Then, end 116 of wire 115 is fed through opening 134 and up through slot 136, as shown in FIG. 10.

In order to lock wire end 116 inside locking unit 117, a set screw 144 is used. Screw 144 is threadingly inserted through screw opening 146 at the rear of housing 130 and longitudinally through passage 140, as best shown in FIG. 12. Screw 144 has a tip or end which pinches against wire 115 in order to secure the same in position. In addition, because of this pinching of screw 144 against wire 115, membrane 142 is flexed or pivoted upwardly, thereby also pinching end 116 of wire 115 along the opposite side thereof. As a result, wire 115 is maintained in a secure and fixed position within housing 130 of locking unit 117.

As can be appreciated, with respect to the embodiment of FIGS. 8–14, in order to remove excess wire, once screw 144 has been disposed inside passage 140 for pinching against end 116 of wire 115, excess wire may be cut or removed so that wire 115 sits inside slot 136 and flush along roof 138, as best shown in FIG. 12.

Figure 15:
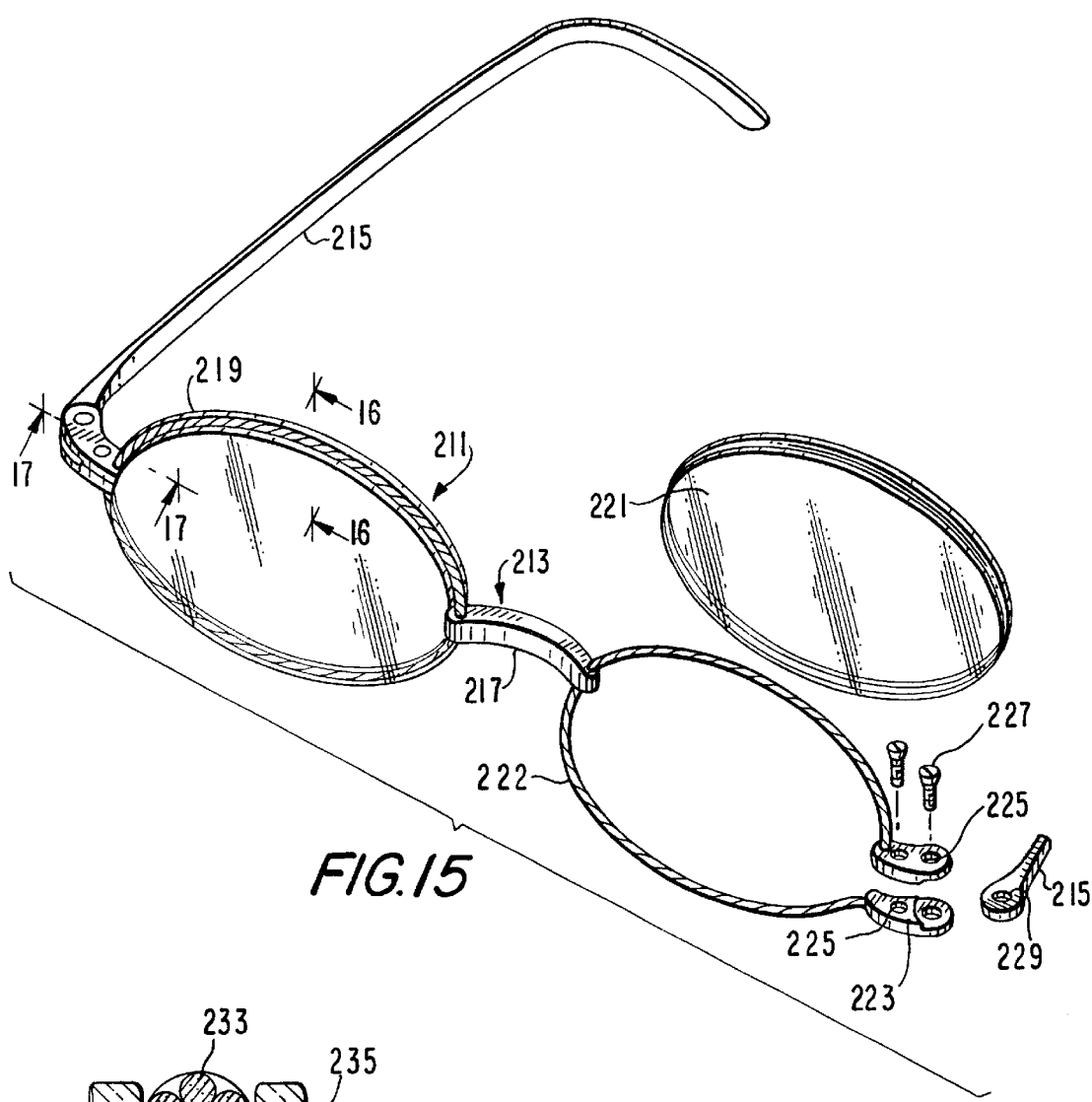
FIG. 15 is a perspective view of an eyeglass frame made in accordance with the invention.
Figure 16:
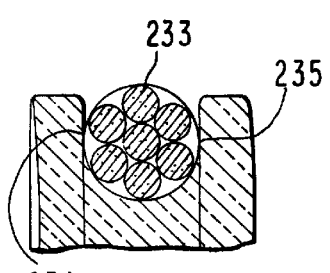
FIG. 16 is a cross-sectional view taken along line 16—16 of FIG. 15.
Figure 17:
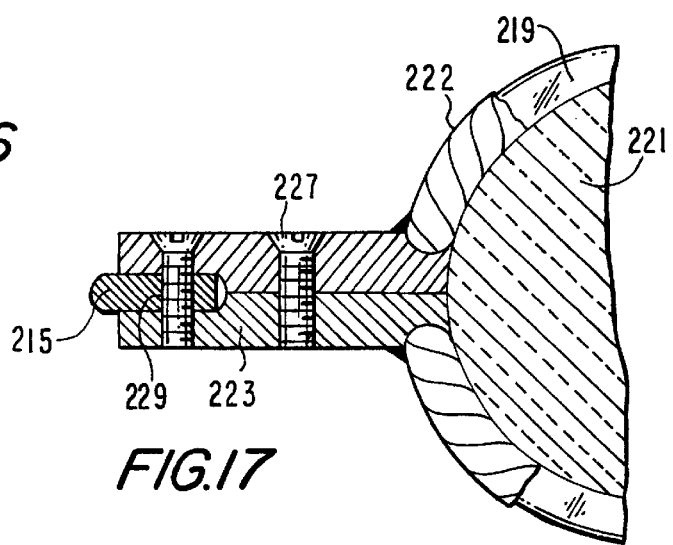
FIG. 17 is a cross-sectional view taken along line 17—17 of FIG. 15.

Referring now to FIG. 15, 16 and 17, a specially designed eyeglass frame made in accordance with the invention and generally indicated at 211 is shown. Eyeglass frame 211 comprises a frame assembly 213, a pair of earpieces or temples 215, a bridge or nosepiece 217 and lens openings 219 for receiving a pair of lenses 221. Extending from each of lens openings 219 are a pair of hinge bars 223 having a pair of openings 225 through which screws 227 may be threaded. Each of earpiece or temples 215 is hingedly received between hinge bars 223 at either end of frame assembly 213. Each of temples 215 includes an opening 229 which is aligned with the outer openings 225 of hinge bars 223. Screw 227 is then past through all three openings so that temple 215 is hingedly engaged to the end of frame assembly 213, as shown in FIG. 15.

Significantly, each of lens openings 219 comprises a cable 222 made from a multi-filament material such as a multi-filament cable, preferably made from a metal or metal alloy, but also from a nylon, polymer, resin, natural fiber or other naturally occurring or man-made material, as is well known. The preferred multi-filament material is multi-filament cable comprising a plurality of filaments 233 (see FIG. 16), and retained in a casing 235. The cable is extremely flexible and strong so that it can be easily wrapped around lens 221 in a secure fashion, as described below. Preferably, the multi filament cable 222 has a thickness of 0.4 and 1.6 mm, and more preferably of between 0.4 and 0.6 mm. The multi-filament cable used in this aspect of the invention has superior flexibility and strength as compared to conventional wires.

As shown in FIGS. 16 and 17, each of lenses 221 received within lens openings 219 has an outer edge formed with a groove 231 in which multi-filament cable 222 defining lens openings 219 is abutingly and hiddenly received. It is noted that the ends of the multi-filament cable are welded to hinge bars 223, as shown in FIG. 17.

The eyeglass frame described in FIGS. 15–17 is advantageous since it is easier for the optician/technician to assemble—it gives the appearance of a rimless frame use—it is much stronger than a mono-filament cable or wire—it enables lens shapes of varying size and configuration—it has superior flexibility—it is much lighter than a conventional frame.

It will thus be seen that the objects set forth above, among those made apparent from the preceding description, are efficiently attained, and, since certain changes may be made in the above system and product without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. An eyewear system comprising at least one eyewear lens having a perimeter of any size, shape or dimension and a multi-filament cable for wrapping around said perimeter.

2. The system of claim 1, wherein said perimeter of said at least one lens has an edge formed with a groove therealong in which said cable is engagingly received.

3. The system of claim 1, wherein said cable is made of a metal or metal alloy.

4. The system of claim 1, wherein said cable has a thickness of between 0.4 and 1.6 mm.

5. The system of claim 1, wherein said cable comprises a plurality of filaments retained in a casing.

6. An eyeglass frame assembly comprising a pair of lens openings connected therebetween by a nose bridge and in which a corresponding pair of lenses is received, wherein each said lens opening is defined by a multi-filament cable wrapped around said corresponding lens.

7. The system of claim 6, wherein each of said lenses has an edge formed with a groove therealong in which said cable is engagingly received.

8. The system of claim 6, wherein said cable is made of a metal or metal alloy.

9. The system of claim 6, wherein said cable has a thickness of 0.4 and 1.6 mm.

10. The system of claim 6, wherein said cable comprises a plurality of filaments retained in a casing.

11. The frame assembly of claim 6, further including a pair of earpieces each pivotally attached to one of said lens openings.

12. The frame assembly of claim 11, wherein each said lens opening has hinge member outwardly extending therefrom, and pivotally connected to said corresponding ear piece.

13. The frame assembly of claim 6, wherein said cable is made from one of a nylon, polymer, resin, and natural fiber.

* * * * *

UNITED STATES PATENT AND TRADEMARK OFFICE
CERTIFICATE OF CORRECTION

PATENT NO. : 6,595,634 B1
DATED : July 22, 2003
INVENTOR(S) : James F. Pilat

It is certified that error appears in the above-identified patent and that said Letters Patent is hereby corrected as shown below:

Column 6,
Line 50, after words "has a thickness of" and before "0.4 and 1.6 mm" insert the word -- between --.

Signed and Sealed this

Twenty-eighth Day of October, 2003

JAMES E. ROGAN
*Director of the United States Patent and Trademark Office*